United States Patent [19]

Taylor et al.

[11] 3,901,425

[45] Aug. 26, 1975

[54] WIRE MOVING APPARATUS

[75] Inventors: Edwin K. Taylor, Oklahoma City; James V. Boyd, Jones, both of Okla.; James H. Williams, Liberty, Mo.

[73] Assignee: Sooner Products Co., Bristow, Okla.

[22] Filed: July 9, 1973

[21] Appl. No.: 377,717

Related U.S. Application Data

[63] Continuation-in-part of Ser. No. 149,909, June 4, 1971, abandoned.

[52] U.S. Cl. .............. 226/108; 226/181; 226/188
[51] Int. Cl. ............................................ B65h 17/20
[58] Field of Search ........... 226/108, 111, 188, 181; 219/130, 131 F; 314/69

[56] References Cited
UNITED STATES PATENTS

| | | | |
|---|---|---|---|
| 3,387,759 | 6/1968 | Stedman | 226/108 |
| 3,693,858 | 9/1972 | Araya et al. | 226/108 |

*Primary Examiner*—M. Henson Wood, Jr.
*Assistant Examiner*—Gene A. Church

[57] ABSTRACT

A wire moving apparatus for moving a wire, specifically a welding wire or the like through a hollow, flexible cable having a liner disposed generally within the hollow portion of the flexible cable and extending axially therethrough. The liner has a wire aperture extending axially therethrough sized to receive the wire and to provide a path for the wire through the flexible cable. A drive assembly is connected to a portion of the flexible cable to drivingly rotate the flexible cable and to create random vibration within the cable assembly for reducing sliding friction between wire and the liner. The rotation of the flexible cable acts to drive a wire pulling assembly at the outlet or wire dispensing end and also drive a wire propagation assembly at the wire inlet. A time delay mechanism provides synchronization between the push assembly and the pulling assembly. Self-induced or induced vibration or random oscillatory motion is imparted to the wire, its liner and its cable enclosures to effectively "float" the wire through the liner, i.e. with a minimal amount of sliding friction.

12 Claims, 8 Drawing Figures

WIRE MOVING APPARATUS

CROSS-REFERENCES

This application is a continuation-in-part of copending application Ser. No. 149,909, filed June 4, 1971 now abandoned. That application is incorporated by reference herein where necessary to clarify mechanism or operation.

BACKGROUND OF THE INVENTION

1. Field of the Invention

This invention relates generally to improvements in apparatus for moving a wire or the like between predetermined positions and, more particularly, but not by way of limitation, to an improved apparatus for moving a wire or the like having an indefinite length through a flexible cable.

2. Description of the Prior Art

In the past there have been many devices proposed for guiding and moving a wire or the like from one position to another or between distant positions. One solution in the past has been to utilize a pair of drive rollers disposed to engage and drivingly push the wire through a shaft generally from one position to another. In this type of application, a motor or other such drive apparatus was connected to at least one of the drive rollers to drivingly rotate the drive roller connected thereto, thereby pushing the wire through the shaft. This particular device has proved useful in some applications, however, particularly in those applications where the wire was of a malleable or flexible material, or where the wire was to be moved more than substantially a very short distance, the wire had a tendency to buckle or become kinked in the shaft. Another disadvantage of the single set of drive rollers lies in that order for the rollers to provide enough driving force on the wire, the said rollers must be strongly forced against the said wire which would cause harmful marking or distoring of the shape of the wire.

In some other applications in the past, a pair of drive rollers were disposed to drivingly pull the wire through the shaft. In these applications, the wire was generally fed into one end of the shaft and pulled therethrough by the drive rollers disposed at the opposite end of the shaft. It has been found that these devices were adequate for moving a wire or the like through small distances, however, for relatively longer distances and, in those applications where the wire was malleable or flexible, the problems of excessive sliding friction on the wire and wire buckling or "bird-nesting," as it is commonly referred to in the art, were still present.

With respect, more particularly, to some arc welding applications, there has been proposed in the past a wire moving apparatus for moving a welding wire through a flexible cable, having a first and a second pair of drive rollers, one pair of drive rollers being disposed to drivingly push the wire electrode into one end of the flexible cable and the second pair of drive rollers being disposed to pull the wire from the opposite end of the cable and to then feed the wire electrode to a welding gun. In this particular application, the drive rollers disposed to pushingly drive the wire electrode through the flexible cable have been driven by the motor, and the drive rollers disposed to pullingly move the wire electrode from the flexible cable have been driven by a second motor. This particular type of wire moving apparatus has been adequate in some applications. However, it has been found that the wire electrode still had a tendency to buckle or become birdnested, particularly in those instances where the wire electrode was constructed of a relatively malleable material, or where the wire electrode was moved through a relatively long length of flexible cable, or in cases where high speed welding is involved thereby necessitating a repair of the wire moving apparatus. Also, without proper synchronization of the drive rollers, the wire may be stretched within the cable which causes breakage thereof or undesirable thin spots along the wire, if the remote rollers start first or run at a faster speed. If, on the other hand, the pushing rollers start first or run at a faster speed the wire will tend to bunch or become bird-nested within the cable.

Another attempted solution to the problem was provided by the patent to Stedman, U.S. Pat. No. 3,387,759, issued June 11, 1968, entitled "Wire Feeding Means." The Stedman patent provided a wire feeding means employing a pair of drive rollers for pushing the wire into a rotating flexible sleeve within the cable and a pair of pulling rollers located in the remote end of the cable for pulling the wire out of the said sleeve. This remote set of pulling rollers are driven through a gear arrangement by the rotating sleeve portion of the cable. The Stedman patent teaches that the wire is also propagated through the flexible rotating sleeve by the thread-like windings of the said flexible sleeve turning and contacting the wire. It has been found that the Stedman device possesses several inherent disadvantages, especially in operation through long length cable, the first being that the wire upon being exposed directly to the rotating flexible sheath causes excessive wear on the wire and further causes the wire to experience a twisting force which tends to kink or buckle the said wire within the said sheath. Another disadvantage lies in the fact that upon restarting the drive rollers with the wire extending therethrough, the pushing drive rollers will start before the pulling drive rollers due to the time delay caused by the inherent flexibility of the rotating sheath. This causes the wire to bunch up within the cable and again results in kinking or bird-nesting of the wire within the said cable.

The field or art relating to arc welding, and particularly those applications utilizing what is commonly referred to in the art as "wire-feed welding," has become extremely active and expanded in recent years, and has therefore created the need for a wire moving apparatus to move a wire electrode efficiently through a length of flexible cable at high speed, over longer distance, while substantially reducing the sliding friction and/or the possibility of stretching, buckling or bird-nesting, especially during start-up procedures, has become extremely vital.

SUMMARY OF THE INVENTION

The present invention provides a wire moving apparatus which is particularly designed and constructed to overcome the above disadvantages. The present invention provides a pair of drive rollers which grippingly engage the wire and propagate the said wire into a liner which is disposed within a rotating sheath through the cable assembly. A second set of drive rollers are located in the dispensing gun at the opposite end of the flexible cable. An induced vibration is provided along the flexible cable caused by the rotating flexible sheath within the said cable which in turn causes the wire to tend to float within the nonrotating liner which greatly reduces sliding friction therealong. This reduction of friction allows a relaxation of the gripping forces applied to the wire by the drive rollers which prevents the marking or other distortion of the shape of the wire being moved therethrough.

Both pairs of drive rollers are operated by the same drive source and a synchronization mechanism is imposed between the drive source and the pushing drive rollers to provide a simultaneous starting of the said drive rollers to insure against stretching or kinking of the wire within the cable.

An object of the invention is to provide a wire moving apparatus for moving a wire through a flexible cable wherein the sliding friction and the possibility of the wire buckling or bird-nesting within the flexible conduit and the possibility of the wire stretching is substantially reduced.

Another object of the invention is to provide a wire moving apparatus for moving a wire through a cable wherein the wire is straightened to some extent.

One other object of the invention is to provide a wire moving apparatus for moving a wire or the like through a relatively long length of cable at a high rate of speed.

A still further object of the invention is to provide a wire moving apparatus for moving wire constructed of a relatively malleable material through a liner within a rotating flexible cable. The invention further provides the inducement or has self-induced vibratory motion to the liner, the flexible cable and to the wire to reduce the sliding friction of the wire and create floatation of the wire and it moves through the liner.

Another object of the invention is to provide a wire moving apparatus having a wire push or propagation assembly and a wire pull assembly wherein each is driven via a common driving source, and are interconnected with a time delay mechanism to synchronize the operation of the push and pull assemblies.

Another objective of the invention is to provide a wire moving apparatus providing a vibratory floatation of the wire, thereby greatly reducing sliding friction and thereby allowing a reduction of the otherwise necessary drive roll pressure on its wire which reduced the tendency of the drive rolls to dent or mark the wire.

A yet further object of the invention is to provide a wire moving apparatus which is economical in construction and operation.

Other objects and advantageous features of the invention will more fully appear in connection with a detailed description of the drawings in which:

DESCRIPTION OF THE PREFERRED EMBODIMENT

Figure 1:
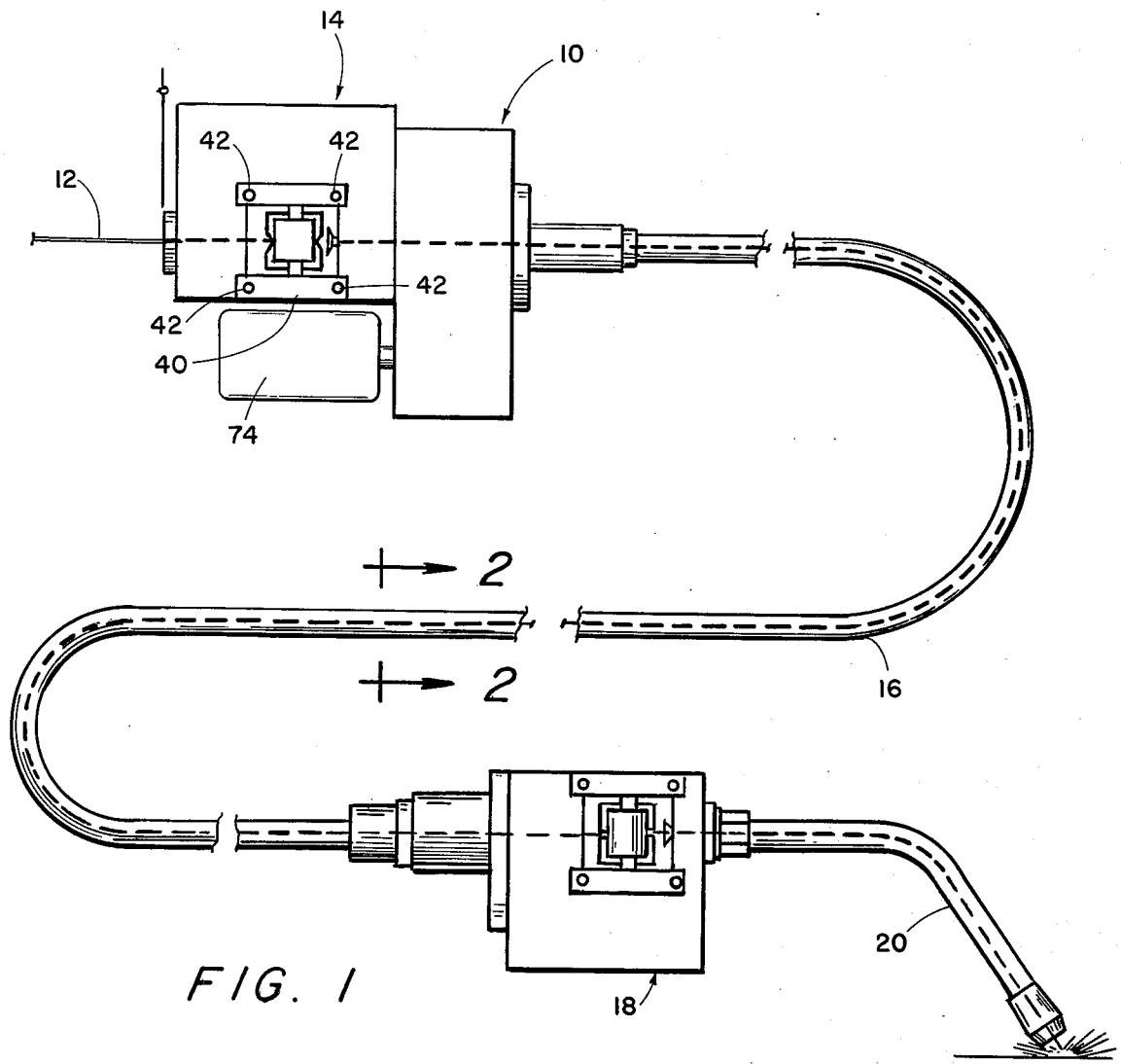
FIG. 1 is an elevational view of a welding wire moving apparatus of this invention.
Figure 4:
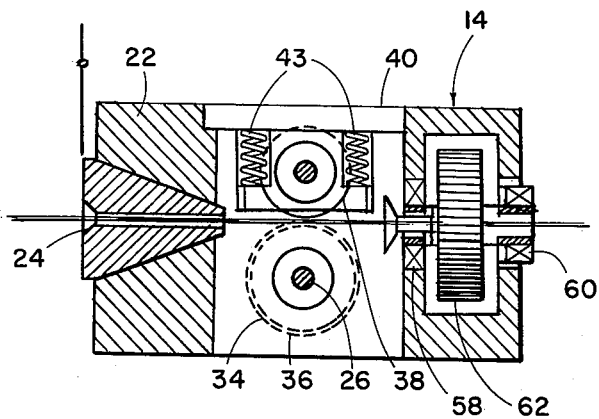
FIG. 4 is a sectional view, transverse to the wire propagation assembly of FIG. 3, showing the disposition of the push drive rollers in the wire feed assembly.

Referring to the drawings in detail, reference character 10 generally indicates a wire moving apparatus which is constructed to move a wire 12 from a wire supply spool or the like (not shown) through a wire feed assembly 14, into and through a flexible cable assembly 16 to a portable gun assembly 18 and subsequently through a nozzle member 20. The embodiment described herein is particularly designed and constructed to be utilized in cooperation with a wire-feed welding apparatus. However, it is noted that the apparatus 10 is also useful in substantially any application wherein it is necessary to move wire through a flexible cable.

The wire-feed welding apparatus 10 is utilized in a gas metal-arc welding process wherein an inert gas is discharged in a portion of the nozzle 20 via conduits (not shown), and the wire 12 is consumed in an inert gas envelope created in the nozzle 20. The gas metal-arc welding process utilized therein basically includes a welding machine, a wire feeder, a control, a gun and various interconnecting cables and hoses. The gas metal-arc welding process and the wire-feed welding apparatus, generally described above, is well known in the art and a detailed description of the various components, the interconnections between the various components, and the operation thereof is not required herein.

The wire feed assembly 14 comprises a housing 22 having a wire inlet port 24 therein for accepting the wire 12 therethrough. It is noted that the housing 22, although depicted by the cross hatching shown in FIG. 3 may comprise a simplified structure having only the necessary mounting structure for supporting the various bearing members that will be hereinafter described.

An elongated rod 26 is vertically disposed and journalled within the housing 22 and supported by three spaced bearing members 28, 30 and 32. A drive roller 34 is secured to the shaft 26 between the bearings 28 and 30 and is provided with a centrally disposed annular groove 36 around the outer periphery thereof. The drive roller 34 is disposed within the housing so that the groove 36 is in tangential alignment with the wire inlet port 24 so that the wire 12 entering the port 24 may lie against the drive roller 34 and in the groove 36 thereof.

A second roller means 38 is journalled within a subhousing 40, the said subhousing 40 being secured to the housing 22 by a plurality of screws 42 so that the said roller means 38 is rotated about an axis which is parallel to the shaft 26 of the drive roller 34, said roller means 38 being in engagement with the roller 34 so that the wire 12 may be passed between the roller means 38 and the drive roller 34 and in engagement therewith. A plurality of compression springs 43 are disposed within the subhousing 40 for exerting a force on the roller means 38 toward the drive roller 34 for applying a gripping pressure on the wire 12 therebetween.

A gear wheel 44 is secured to the shaft 26 between the bearings 30 and 32 for simultaneous rotation with the said shaft 26. A longitudinally disposed elongated shaft 46 is journalled within the housing 22 by means of a pair of spaced bearings 48 and 50 disposed at either end of the said shaft 46, said shaft 46 being offset from the vertically disposed shaft 26 hereinbefore described. A helical or worm gear 52 is secured to the shaft 46 adjacent to the gear wheel 44 and in meshing engagement therewith. Whereby upon rotation of the shaft 46 and worm gear 52 attached thereto, rotation of the shaft 26 about its vertical axis is imparted thereby effecting rotation of the drive roller 34 and its associated roller means 38.

A wheel gear 54 is secured to the shaft 46 between the worm gear 52 and bearing 48 for simultaneous rotation with the said shaft 46. A hollow shaft member 56 is longitudinally disposed and journalled within the housing 22 by a pair of spaced bearing members 58 and 60, the center line axis of the said sleeve member 56 being disposed in coaxial alignment with the wire inlet port 24 and in tangential alignment with the roller means 38 and the drive roller 34. A second wheel gear 62 is secured to the sleeve member 56 for simultaneous rotation therewith, the said wheel gear 62 being disposed in meshing engagement with the wheel gear 54 on the shaft 46. Therefore, upon rotation of the sleeve member 56 and the wheel gear 62 thereon, rotary motion is imparted to the shaft 46 via the wheel gear 54. As hereinbefore set forth, rotation of the shaft 46 is imparted to the vertically disposed shaft 26 via the worm gear 52 and the associated wheel gear 44 which in turn rotates the drive roller 34 and its associated pressure roller means 38 for longitudinally propagating the wire 12.

A drive assembly generally indicated by reference character 64 is operably connected to the feed assembly 14 the said drive assembly 64 comprising a housing 66 which is secured to the housing 22 of the feed assembly 14. A longitudinally disposed sleeve member 68 is journalled within the housing 66 by means of a pair of spaced bearings 70 and 72, the said sleeve member 68 having its axis in coaxial alignment with the sleeve member 56 of the feed assembly 14. A pulley wheel or sheath 73 is secured to the sleeve member 68 between the bearing members 70 and 72. A drive motor 74 having a drive shaft 76 is secured to the housing 66 in any well known manner, the said drive shaft 76 being journalled within the housing 66 and rotatingly spaced therein by a pair of spaced support bearings 78 and 80. A second pulley member or sheath 82 is secured to the motor shaft 76 between the bearings 78 and 80. An endless belt member 84 is provided around the outer periphery of the sheath members 73 and 82 for transmitting rotation therebetween.

Figure 3:
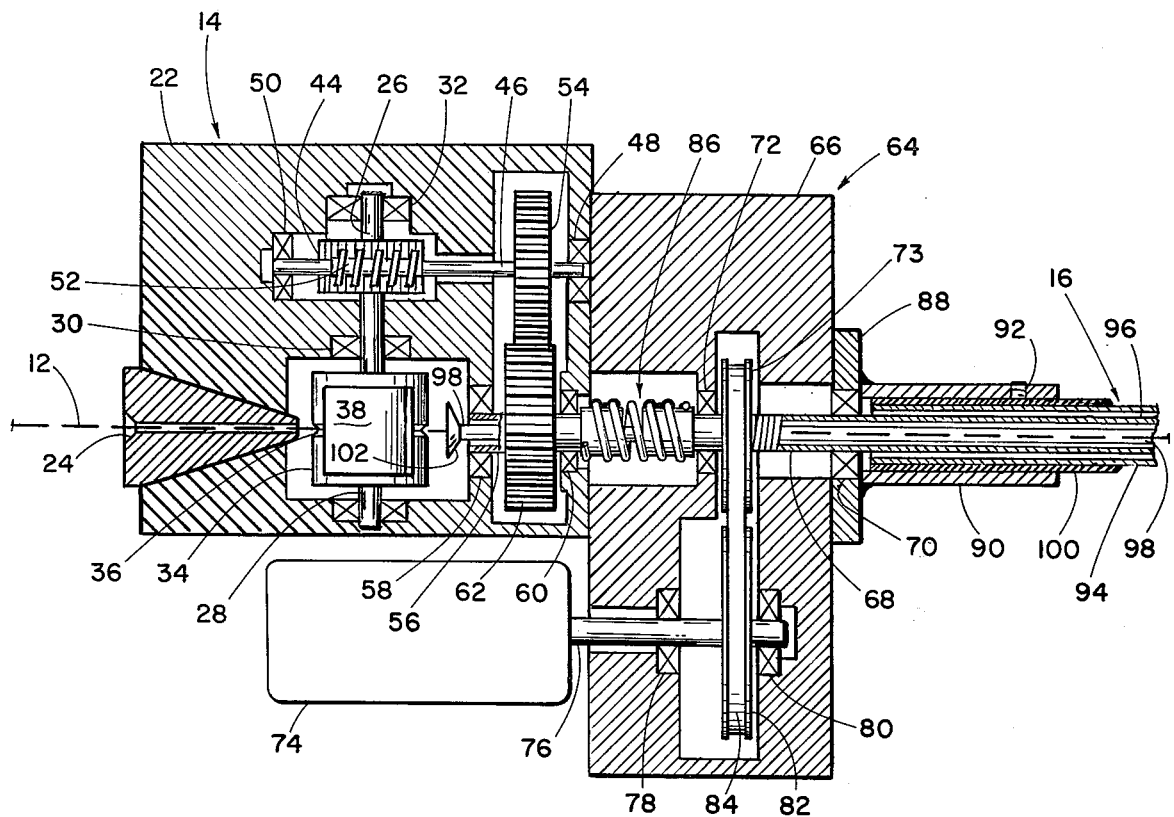
FIG. 3 is a top sectional, partial elevational view of the wire push assembly and the wire drive assembly of the wire moving apparatus of FIG. 1.
Figure 5:
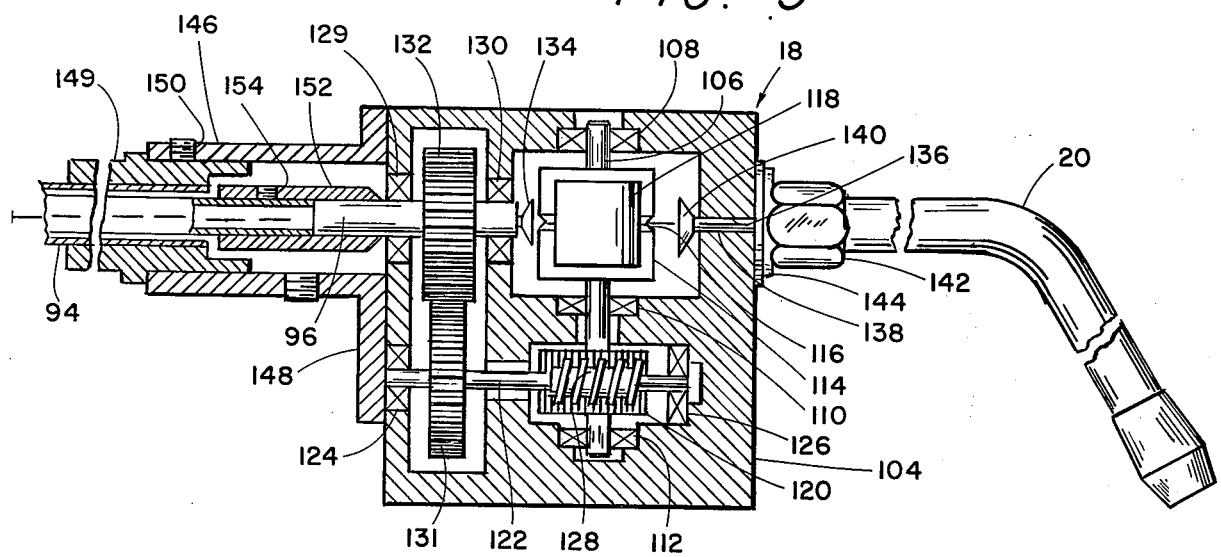
FIG. 5 is a partial sectional, elevational view of the wire pull assembly of the wire moving apparatus of FIG. 1.

The rotatable sleeve member 68 of the housing 66 is operably connected to the sleeve member 56 of the feed assembly 14 by means of a time delay mechanism generally indicated by reference character 86 which will be hereinafter more fully described. The bearing means 70 may be either secured to the housing 66 or located within a separate bearing housing or flange member 88 secured to the outer periphery of the housing 66 as shown in FIG. 3. A cable assembly attach sleeve 90 is secured to the housing 66 for the flange member 88, the said sleeve 90 having its center line axis in coaxial alignment with the sleeve member 68. The cable assembly 16 may be secured within the sleeve 90 in any well known manner such as by means of the set screw 92 as shown in FIG. 3.

Figure 2:
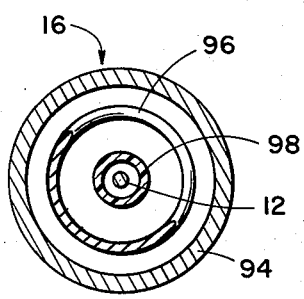
FIG. 2 is a sectional view of the cable assembly of FIG. 1, taken substantially along the line 2—2 of FIG. 1.

Referring now to FIG. 2, the cable assembly 16 generally extends between the drive assembly 64 and the gun assembly 18 and comprises a hollow outer casing 94 which is constructed of a flexible material but with sufficient rigidity to maintain a substantially round cross sectional shape when under or when in a bent position. An elongated flexible cable, hereinafter referred to as the flexible rotating sheath 96 is longitudinally disposed within or journalled within the outer casing 94 and is preferably constructed of a flexible wound wire.

A plastic hollow liner 98 is longitudinally slidingly disposed within the rotating sheath 96, the wire 12 being longitudinally disposed within the liner 98 and movable both longitudinally and transversely with respect thereto. One end of the outer casing 94 is connected to the sleeve 90 of the drive assembly 64 as hereinbefore set forth. The casing 94 is rigidly secured within a sleeve stiffening member 100, the stiffening member 100 being disposed within the sleeve 90 and secured therein by one or more set screws 92 as shown in FIG. 3. The rotating sheath 96 which is journalled within the casing 94 and spaced therefrom may be secured at one end thereof to the rotating sleeve member 68 of the drive assembly 64. However, it may be desirable, as shown in FIG. 3, to simply extend the rotating sheath 96 into the drive assembly housing 66 so that the rotating sheath 96 and sleeve 68 are one and the same. Stated another way, the end of the rotating sheath 96 is journalled within the housing 66 of the drive assembly 64 by means of the spaced bearings 70 and 72. The end of the rotating sheath 96 would therefore be secured to one end of the time delay mechanism 86. It is also noted that the rotating sleeve member 56 of the housing 22 may also be constructed of the same material as that of the rotating sheath 96.

One end of the liner 98 is disposed within the housing 22 of the feed assembly 14 between the drive rollers 34 and 38 and the sleeve bearing member 58. The end of the liner 98 is provided with a funnel shaped guide member 102 which serves a twofold purpose. The first purpose being to channel the wire 12 into the liner 98 as the said wire 12 is fed through the drive rollers 34 and 38. The second purpose of the guide member 102 is to prevent the liner 98 from slipping outwardly through the rotating sleeve member 56. The liner 98 extends through the sleeve member 56, through the time delay mechanism 86, and outwardly into the rotating sheath 96. The opposite end of the cable assembly 16 is secured to the gun assembly 18 in a manner that will be hereinafter set forth.

The gun assembly 18 constitutes a remote wire feed assembly which is substantially identical to the feed assembly 14 hereinbefore described. The gun assembly 18 comprises a housing 104 having a vertically disposed shaft 106 journalled therein by means of three spaced bearings 108, 110 and 112. A cylindrical drive roller 114 is secured to the shaft 106, the said drive roller 114 being provided with centrally disposed annular groove 116 therearound. A second roller means 118 which is substantially identical to the roller means 38 is journalled within a subhousing 21 which is substantially identical to the subhousing 40 and is urged into contact with the drive roller 114 by a plurality of springs (not shown) which are substantially identical to the springs 43 associated with the roller means 38. A wheel gear 120 is secured to the shaft 106 between the bearings 110 and 112.

A second longitudinally disposed shaft 122 which is substantially identical to the shaft 46 of the feed assembly 14 is rotatably secured within the housing by means of a pair of spaced bearings 124 and 126. A worm gear 128 is secured to the shaft 122 and disposed in meshing engagement with the gear wheel 120. A second gear wheel 131 is secured to the shaft 122 between the worm gear 128 and the bearing 124. The opposite end of the rotating sheath 96 extends into the housing 104 and is rotatably secured thereto by means of a pair of spaced bearings 129 and 130. A third gear wheel 132 is secured to the rotating sheath 96 between the bearings 129 and 130 and disposed in meshing engagement with the gear wheel 131.

The exit end of the rotating sheath 96 is disposed in tangential alignment with the contact point between the drive rollers 114 and 118. The exit end of the liner 98 extends through the rotating sheath 96 into the housing 104 and is provided with a funnel shaped retainer member 134 which is substantially identical to the guide member 102 located at the opposite end thereof. The retainer member 134 is used primarily for preventing the said sleeve member 98 from slipping back into the rotating sheath 96.

The housing 104 is provided with a wire outlet port 136 having a center line axis in coaxial alignment with the bearings 129 and 130 and in tangential alignment with the points of contact between the drive rollers 114 and 118. A liner section 138 which may be constructed of the same material as the liner 98 is fitted within the wire outlet port 136, the inner end of the liner 138 being provided with a funnel shaped guide member 140 which is substantially identical to the guide member 102 of the feed assembly 114.

One end of the nozzle 20 is secured to the housing 104 in coaxial alignment with the outlet port 136 thereof. The nozzle 20 is secured to the housing in any well known manner such as by means of the nut 142 and a housing mounted boss assembly 144.

A cable assembly attachment sleeve 146 is secured to the housing 104 by means of a suitable flange member 148, the said sleeve 146 being oppositely disposed from the nozzle 20 also secured to the housing 104. The gun assembly end of the cable outer jacket 94 is provided with a stiffener sleeve member 149 secured therearound, the said stiffener sleeve member being disposed within the attachment sleeve 146 and secured therein by means of one or more suitable set screws 150. The rotating sheath 96 is provided with a stiffener sleeve 152 which is disposed around the sheath 96 one end of which is adjacent to the bearing member 129 which supports the said sheath 96. The opposite end of the stiffener sleeve 152 is disposed near the end of the cable outer casing 94 and is secured to the sheath 96 by means of a suitable set screw 154 or the like.

Figure 6:
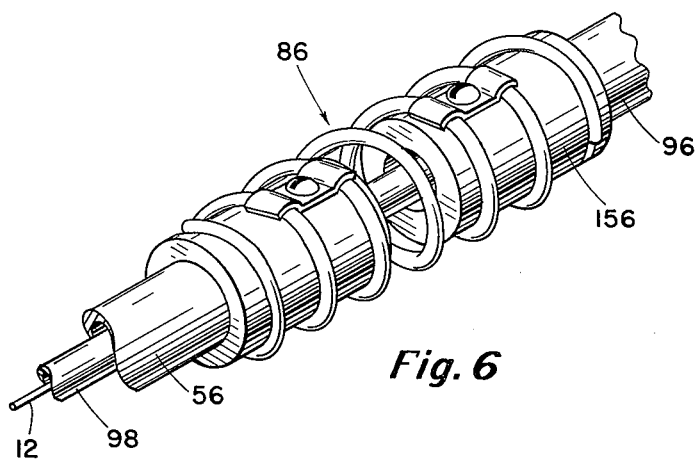
FIG. 6 is a perspective view of the time delay mechanism of FIG. 3.
Figure 7:
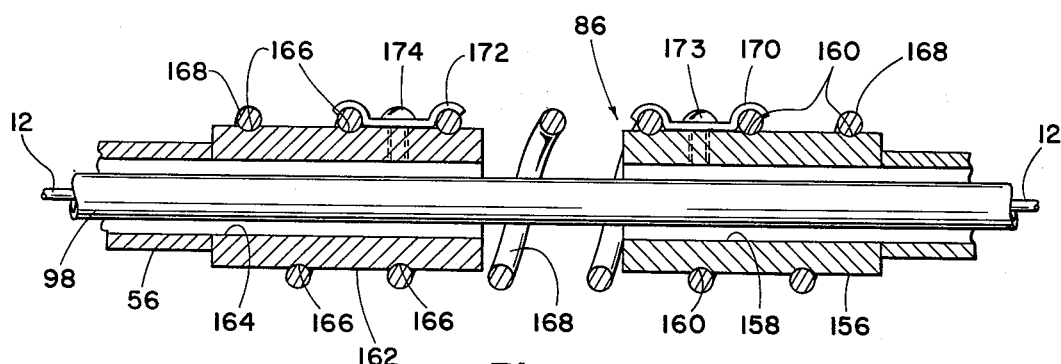
FIG. 7 is an elevational sectional view of the mechanism of FIG. 6.

Referring now to FIGS. 6 and 7, the time delay apparatus which operably connects the drive assembly 64 to the feed assembly 14 comprises a first cylindrical mandrel 156 having a longitudinal bore 158 therethrough, one end of the said mandrel 156 being secured to the end or the rotating sheath 96 of the cable assembly 16 by any well known manner such as by welding or the like. The internal bore 158 of the mandrel 156 is constructed to be of essentially the same diameter as the internal bore of the sheath 96. The mandrel 156 is provided with a helical groove 160 along the outer periphery thereof.

The time delay mechanism 86 also comprises a second substantially identical cylindrical mandrel 162 which is spaced from the mandrel 156 and has one end thereof secured to the rotating sleeve member 56 of the feed assembly 14. The mandrel 162 is likewise provided with a longitudinally disposed bore 164 therethrough which is coincidental with the bore through the sleeve 56. The mandrel 162 is likewise provided with a helical groove 166 along the outer periphery thereof, the said groove being substantially identical to the groove 160 of the mandrel 156 and having the same pitch thereof.

The mandrels 156 and 162 are yieldably connected together by means of a helical spring 168 which is disposed along the outer periphery of the mandrels 156 and 162, the said spring being more particularly disposed within the helical grooves 160 of the mandrel 156 and the helical grooves 166 of the mandrel 162. The spring 168 is held in place with respect to the mandrels by means of a pair of brackets 170 and 172, respectively. The brackets are secured to the mandrels 156 and 162 by a pair of screws 173 and 174, respectively.

It is readily apparent that if rotational forces or torque is applied to the mandrel 156 from the drive assembly 64, some time delay will occur before the full torque is applied across the space to the mandrel 162. That time delay is governed by the amount of space between the mandrels 156 and 162 and also by the spring constant for the helical spring 168. Since the wire 12 will always be fed through the apparatus from the feed assembly 14 toward the gun assembly 18, the spring 168 would be wound in a manner such that when the torque is applied to the mandrel 156, the spring will tend to tighten around the mandrels 156 and 162 and contraction of the segment of spring 168 between the mandrels 156 and 162 would tend to pull the said mandrels toward each other until sufficient tightness is achieved to effectively transfer the torque being applied by the drive assembly to the mandrel 162 and in turn to the feed assembly gearing as hereinbefore described.

Adjustability of the time delay may be provided by urging the lengths of the mandrels thereby varying the space therebetween which in turn varies the length of the segment of the spring 168 available for contraction upon applying torque thereto. The time delay may also be varied by the utilization of springs 168 having different spring constants. If a stiffer spring is used, the time delay will be reduced where on the other hand if a softer spring is used, the time delay will be increased.

In operation, a wire 12 may be fed into the feed assembly 14 through the inlet port 24, between the drive rollers 34 and 38. The motor 74 may then be activated which by way of the sheaves 73 and 82 and the cooperating belt 84 causes rotation of the rotating sleeve 96 and after a predetermined time delay due to the mechanism 86, rotation is imparted to the rotating sleeve member 56. Rotation of the sleeve member 56 in turn causes the drive rollers 34 and 38 to rotate thereby gripping the wire 12 therebetween and feeding the said wire into the liner 98 through the liner guide member 102. Thus, the wire 12 is fed through the drive assembly and into the cable assembly 16.

Now, it has been found through experimentation that, the action of the rotating sheath 96 within the cable outer jacket 94 will inherently set up a vibration or random vibration throughout the cable assembly 16. The frequency of this random vibration is naturally dependent upon the speed in which sheath 96 is being rotated. The sheath 96 will bump and turn within the outer casing 94 and will further impart this vibration to the liner 98 therein. This random vibration of the liner 98 serves to randomly impact the wire 12 traveling therethrough which tends to float the said wire 12 therein, thereby greatly reducing the friction that would normally be present in attempting to slide a wire 12 through the liner without any movement other than longitudinal movement of the wire itself. Since the wire 12 is being longitudinally moved through the liner 98, the friction therebetween is in the form of dynamic friction as opposed to the greater static friction but is even greatly reduced below the dynamic friction since the wire is only intermittently contacting the sides or inside walls of the liner 98.

The wire 12 is then fed out of the cable assembly 16 and into the gun assembly 18 and is fed into gripping contact between the drive rollers 114 and 118 of the gun assembly 18. Since the gun assembly 18 is substantially identical to the feed assembly 14, the drive rollers 114 and 118 of the gun assembly 18 will tend to pull the wire at the same speed that it is being pushed by the rollers 34 and 38 of the feed assembly 14. The wire 12 is then fed into the liner 138 of the outlet port 136 and into the nozzle 20 attached thereto. The wire is then fed through the nozzle 20 out the outer end thereof for use in the welding operation as hereinbefore set forth.

After the wire has been fed through the wire moving apparatus 10 it is necessary to stop the movement thereof, the motor is simply turned off, leaving the said wire 12 extending from the inlet port 24 of the feed assembly through the drive assembly 14, the cable assembly 16, the gun assembly 18 and the nozzle 20.

Upon restarting, the motor 74 is activated which in turn imparts rotation to the rotating sheath 96. This rotation will be transmitted to the gun assembly 18 after a certain delay caused by the inherent construction of the rotating sheath 96 and the length of the said rotating sheath 96. This delay in starting rotation of the drive rollers 114 and 118 of the gun assembly 18 is compensated for in the feed assembly 14 by means of the time delay mechanism 86; The time delay mechanism 86 is adjusted as hereinbefore set forth to provide essentially the same time delay between the drive assembly 64 and the feed assembly 14 as is inherently present between the drive assembly 64 and the gun assembly 18. By properly adjusting the time delay mechanism 86, a synchronous start between the pulling drive rollers 114 and 118 of the gun assembly 18 and the pushing drive rollers 34 and 38 of the feed assembly 14 is accomplished.

It has been discovered through experimentation, if the wire 12 is very malleable the use of synchronized drive rollers in the feed assembly and the gun assembly will serve to prevent any buckling within the wire moving apparatus upon starting movement thereof after the wire has been initially fed through the apparatus. In cases where the wire 12 is less malleable experimentation has indicated that the gun assembly drive rollers 114 and 118 are not absolutely necessary so long as sufficient vibration is maintained within the cable assembly 16 as hereinbefore set forth.

Figure 8:
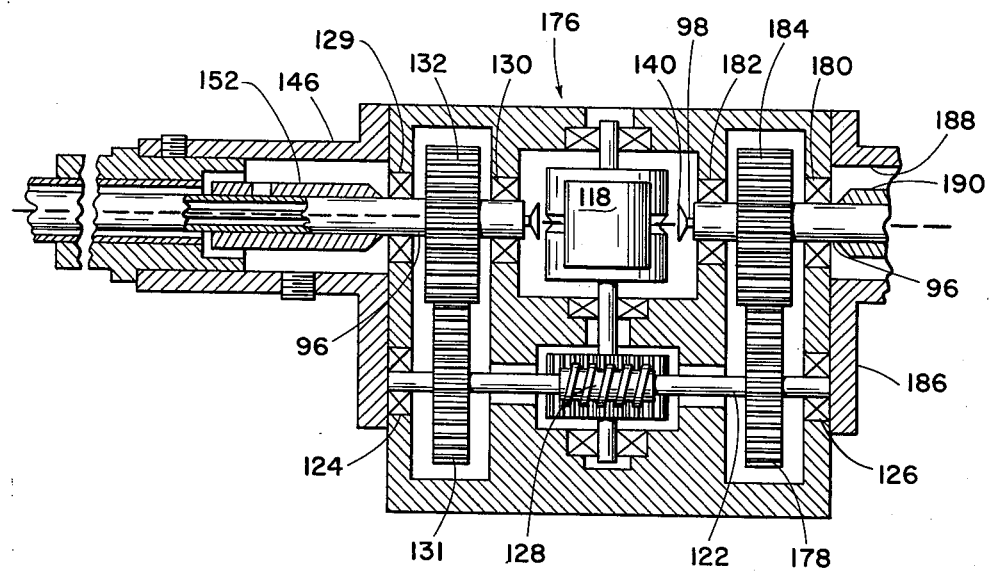
FIG. 8 is a partial sectional elevational view of an mid-cable drive assembly.

In cases where it is desirable or necessary to use an extra long cable assembly 16 between the nozzle 20 and the feed assembly 14, it may be necessary to use a mid cable drive assembly as generally indicated by reference character 176 of FIG. 8. The mid cable drive assembly 176 is substantially identical to the gun assembly 18 with the exception of the wire outlet portion thereof. For ease of description, components of the mid cable drive assembly 176 which are identical to the components of the gun assembly 18 will be numbered with the same reference characters as that of the gun assembly 18.

In case of the mid range drive assembly 176 the rotatable shaft 122 is extended in length toward the wire outlet side of the housing and is still supported at each end by the bearing members 124 and 126. However, a gear wheel 178 is secured to the shaft 122 between the worm gear 128 and the bearing 126. This gear wheel 178 is substantially identical to the gear wheel 131 and is keyed to the shaft 122 for simultaneous rotation therewith.

One end of a second rotating sheath 96 of a second section of cable assembly 16 is rotatably secured within the mid cable drive assembly housing by means of a pair of spaced bearings 180 and 182 which are substantially identical to the bearings 128 and 130, respectively. A second gear wheel 184 which is substantially identical to the gear wheel 132 is secured to the rotating sheath 96 between the bearings 180 and 182 and disposed in meshing engagement with the gear wheel 178. A cable assembly attachment sleeve 186 which is substantially identical to the attachment sleeve 146 having a longitudinal bore 188 therethrough, it is rigidly secured to the mid cable drive assembly housing, the axis of the bore 188 being in coaxial alignment with that of the bearing members 180 and 182 and the corresponding rotating sheaths 96. It is noted that the center line axis of all the bearing members 129, 130, 180 and 182 are in coaxial alignment with each other and in tangential alignment with the contact point between the drive rollers 114 and 118. A stiffener sleeve 190 is secured to the rotating sheath 96, the sleeve member 186 and adjacent to the bearing 180, the said stiffener sleeve 190 being substantially identical to the stiffener sleeve 152. A second cable section 16 is secured to the cable attachment sleeve 186 at one end thereof, the opposite end thereof being provided with either a gun assembly 18 or simply a nozzle 20 attached thereto.

It is readily apparent that when the mid cable drive assembly 176 is utilized for connecting an additional cable assembly 16 to the wire moving apparatus the same principles apply for moving the wire between the feed assembly 14 and the mid cable drive assembly 76 as that between the feed assembly 14 and the gun assembly 18 as hereinbefore described. The cable section 16 which is operable connected to the mid cable drive assembly 176 at the cable attachment sleeve 186 will still set up the vibratory motion as hereinbefore described for ease in allowing the wire 12 to flow through the liner 98 thereof.

From the foregoing it will be apparent that the present invention provides a wire moving apparatus which is particularly designed and constructed for efficiently moving welding wire or the like therethrough at a high rate of speed and with a high degree of mobility while greatly reducing the chances of the said wire being stretched, marked, buckled or becoming kinked within the said moving apparatus.

Whereas the present invention has been described in particular relation to the drawings attached hereto, other and further modifications, apart from those shown or suggested herein may be made within the spirit and scope of this invention.

For example, various yieldable devices may be utilized to effect a time delay in place of the time delay apparatus 86 as hereinbefore described and various other means may be used to affect cable assembly vibration such as by use of a rotating cable having an elliptical cross sectional shape or by the use of an exterior vibrator secured to the cable assembly itself.

Another workable embodiment which would allow the wire 12 to feed through the liner 98 would be to simply strap the liner 98 to the outside of the cable casing 94 whereby the said liner 98 with wire 12 passing therethrough would receive vibration from the cable casing 94 and rotating sheath 96 therein. Stated another way it is not absolutely necessary that the wire 12 with associated sleeve 98 be centrally disposed within the cable assembly 16.

What is claimed is:

1. A wire moving apparatus for moving wire therethrough and comprising wire feed means for accepting the wire therein, wire dispensing means remote from the wire feed means for guiding the wire out of the wire moving apparatus, flexible cable means connected between the wire feed means and the wire dispensing means, drive means operably connected to the wire feed means and the cable means to drivingly rotate a portion of said cable means; said flexible cable means comprising an elongated hollow flexible outer casing secured between the wire feed means and the wire dispensing means, an elongated flexible sheath journalled within the outer casing, one end thereof being rotatably connected to the wire feed means and operably connected to the drive means, the opposite end thereof being rotatably connected to the wire dispensing means, an elongated hollow flexible liner loosely disposed within the rotatable flexible sheath, one end of said liner being retained within the wire feed means and the opposite end thereof being retained within the wire dispensing means; wire propagation means carried by the wire feed means and propagation drive means carried between the wire propagation means and the drive means, said wire propagation means being disposed in gripping engagement with the wire for longitudinally moving the wire through the flexible liner of the cable means, whereby the rotation of the flexible sheath within the outer casing sets up a vibration throughout the cable means, thereby imparting a random vibration to the flexible liner which causes substantial flotation of the wire being moved therethrough thereby greatly reducing friction between the wire and the flexible liner.

2. A wire moving apparatus as set forth in claim 1 wherein an intermediate wire drive means is connected to the flexible cable means between the wire feed means and the wire dispensing means said intermediate wire drive means comprising an intermediate wire drive housing, a pair of drive rollers rotatably secured within said housing, said rollers being positioned to grippingly engage the wire therebetween, means for operably connecting at least one of said rollers to the rotatable flexible sheath to rotatingly drive one of said rollers for longitudinally moving the said wire from the wire feed means to the wire dispensing means.

3. A wire moving apparatus as set forth in claim 1 wherein the liner is constructed of an impervious resilient material.

4. A wire moving apparatus as set forth in claim 1 wherein the liner is provided with a funnel shaped end portion disposed adjacent to the wire propagation means for guidingly receiving the wire therethrough.

5. A wire moving apparatus as set forth in claim 1 wherein the wire dispensing means comprises a wire dispensing housing, one end of the flexible being rotatably secured to one side of the housing and nozzle means operably connected to the opposite side of the said housing, said nozzle means being for the purpose of guiding the wire out of the wire moving apparatus.

6. A wire moving apparatus as set forth in claim 5 wherein the wire dispensing means includes wire pulling means carried by the wire dispensing housing and disposed in gripping engagement with the wire, said wire pulling means being operably connected to the rotatable flexible sheath.

7. A wire moving apparatus as set forth in claim 6 wherein the wire pulling means comprises a pair of drive rollers rotatably secured within the wire dispensing housing, said rollers being positioned to grippingly engage the wire therebetween, means for operably connecting at least one of the said rollers to the rotatable flexible sheath to rotatingly drive said roller for longitudinally pulling the wire out of the cable means and into and through the nozzle means.

8. A wire moving apparatus as set forth in claim 6 wherein the propagation drive means comprises a synchronization mechanism which is operably connected between the drive means and the wire propagation means for synchronizing the starting and stopping of the wire propagation means with the wire pulling means.

9. A wire moving apparatus as set forth in claim 8 wherein the synchronization mechanism comprises yieldable shaft means operably connected between the drive means and the wire propagation means whereby upon starting the drive means torque applied at one end of the yieldable shaft means is transmitted to the opposite end of said yieldable shaft after a predetermined time delay.

10. A wire moving apparatus as set forth in claim 9 wherein the yieldable shaft means comprises a pair of spaced cylindrical mandrels, each having longitudinal bores therethrough, one of said mandrels being operably connected to the wire propagation means, a helical spring operably connected between the said mandrels and secured thereto.

11. A wire moving apparatus as set forth in claim 10 wherein the time delay is adjustable by at least one of the mandrels being removably attached and thereby replacable by a sleeve of different length which in turn adjusts the space therebetween.

12. A wire moving apparatus as set forth in claim 10 wherein the time delay is adjustable by the helical spring being removably secured between the mandrels thereby permitting replacement thereof with a helical spring having a different spring constant.

* * * * *